US011345001B2

(12) United States Patent
Myers et al.

(10) Patent No.: US 11,345,001 B2
(45) Date of Patent: May 31, 2022

(54) SOCKET AND SOCKET ATTACHMENT (71) Applicant: Superbolt, Inc., Carnegie, PA (US)

(72) Inventors: William Myers, Jefferson Hill S, PA (US); Andrew McPhee, Crescent Chapel Hill (AU)

(73) Assignee: SUPERBOLT, INC., Carnegie, PA (US)

( * ) Notice: Subject to any disclaimer, the term of this patent is extended or adjusted under 35 U.S.C. 154(b) by 12 days.

(21) Appl. No.: 16/629,345

(22) PCT Filed: Jul. 9, 2018

(86) PCT No.: PCT/US2018/041224
§ 371 (c)(1),
(2) Date: Jan. 8, 2020

(87) PCT Pub. No.: WO2019/014097
PCT Pub. Date: Jan. 17, 2019

(65) Prior Publication Data
US 2021/0138613 A1 May 13, 2021

Related U.S. Application Data (60) Provisional application No. 62/530,313, filed on Jul. 10, 2017.

(51) Int. Cl.
*B25B 13/06* (2006.01)
*B25B 23/10* (2006.01)
(Continued)

(52) U.S. Cl.
CPC ............ *B25B 13/06* (2013.01); *B25B 23/108* (2013.01); *B25B 29/02* (2013.01); *F16B 31/04* (2013.01)

(58) Field of Classification Search
CPC ..... B25B 13/06; B25B 13/065; B25B 23/108; B25B 29/02; F16B 31/04
See application file for complete search history.

(56) References Cited

U.S. PATENT DOCUMENTS

| 4,100,824 A | 7/1978 | Marschke |
| 4,882,957 A | 11/1989 | Wright |

(Continued)

FOREIGN PATENT DOCUMENTS

| DE | 102008055559 A1 | 6/2010 |
| JP | 9216172 A | 8/1997 |
| JP | 2000104770 A | 10/2001 |

OTHER PUBLICATIONS

International Preliminary Report on Patentability for corresponding application PCT/US2018/041224 filed Jul. 9, 2018; dated Feb. 20, 2019.

(Continued)

*Primary Examiner* — David B. Thomas
(74) *Attorney, Agent, or Firm* — Cantor Colburn LLP (57) ABSTRACT A socket for rotatably fastening or unfastening a jackbolt of a multi jackbolt tensioner the socket extending between a first end and a second end such that the first end is adapted to receive the jackbolt, the socket comprising: a passage extending along a length of the socket to receive a head of the jackbolt, the passage being defined by a plurality of even-numbered internal side walls dimensioned to engage a plurality of sides of the head of the jackbolt received therein, the socket having a central axis with diametrically opposed pairs of said side walls being parallel to each other, and pairs of adjacent side walls meeting to form corner portions to receive corners of the jackbolt head; a plurality of guiding members arranged circumferentially about an opening of the passage to guide the head of the jackbolt into the passage and align the plurality of sides of the head of jackbolt such (Continued)

that corners of the jackbolt head are aligned into position with corner portions of said pairs of adjacent side walls.

18 Claims, 8 Drawing Sheets

(51) Int. Cl.
*B25B 29/02* (2006.01)
*F16B 31/04* (2006.01)

(56) References Cited

U.S. PATENT DOCUMENTS

2012/0285298 A1  11/2012  Richardson
2013/0032009 A1   2/2013  Hui

OTHER PUBLICATIONS

International Search Report for corresponding application PCT/US2018/041224 filed Jul. 9, 2018; dated Oct. 9, 2018.
Written Opinion for corresponding application PCT/US2018/041224 filed Jul. 9, 2018; dated Oct. 9, 2018.
European Search Report for corresponding application EP18832930; Report dated Sep. 9, 2021.
Chinese Office Action for corresponding application 201880045756.4; Report dated Feb. 20, 2021.
Invitation Pursuant to Rule R62(a)(1) EPC for corresponding European Application 18 832 930.4 dated Mar. 5, 2021.

SOCKET AND SOCKET ATTACHMENT

BACKGROUND

A Multi-Jackbolt Tensioner (MJT), such as the tensioner sold under the Superbolt® brand, is generally used as a direct replacement for hex nuts, covered nuts, bolts, etc. of a size typically of 1" or greater. A conventional (nut based) MJT threads onto an existing bolt or stud (not shown) providing a highly effective means to "bolt up the joint". The typical MJT consist of three components, i) a hardened washer to provide a hardened, flat surface for the jackbolts to "push" against; ii) an often round nut body that threads onto the existing bolt or stud and seats against hand tight against the washer initially; and iii) a polar array of jackbolts that thread through the nut body so that their point force against the washer pre-tensions the bolt or stud.

MJTs have addressed some significant problems from the past. However, the use of MJT has given rise to some other problems which need to be addressed. Specifically, each jackbolt of the MJT must be separately tightened. Some industrial applications require implementation of multiple MJTs and in such applications, the tightening of each jackbolt can become time consuming. Typically, the tightening of jackbolts involves the use of a wrench or a hand held tool with a socket. During use, the socket must be aligned with each of the jackbolts prior to tightening. Aligning the socket with the head of the jackbolts (which comprise a hexagonal head) in order to fasten or unfasten generally increases the length of time required for fastening or unfastening each jackbolt. By way of example, if a large assembly utilising ten MJTs is considered with each MJT being bolted with 10 jackbolts then 100 individual jackbolts would need to be tightened, each tightened to a designated tension. As a result, even a small decrease in the time taken for aligning a jackbolt with the socket can result in significant reduction of time taken for carrying out MJT based operations.

A conventional socket known in the prior art is adapted for coupling a hexagonal head portion of each individual jackbolt into an opening of the socket for rotatably fastening or unfastening the jackbolt. As explained above, such a conventional socket relies on the operator to align the opening of the socket with the hexagonal head of the jackbolt to ensure that side walls of the hexagonal head of the jackbolt are well aligned with walls defining the opening of the socket. The alignment step is not only time consuming but can also result in operator fatigue due to the weight of the hand held tool or wrench attached to the socket. Therefore, it is desirable to provide an improvement that addresses some of the aforementioned shortcomings of the prior art.

SUMMARY OF THE INVENTION

In one aspect, the invention provides a socket for rotatably fastening or unfastening a jackbolt of a multi jackbolt tensioner, the socket extending between a first end and a second end such that the first end is adapted to receive the jackbolt, the socket comprising:
  a passage extending along a length of the socket to receive a head of the jackbolt, the passage being defined by a plurality of even-numbered internal side walls dimensioned to engage a plurality of sides of the head of the jackbolt received therein, the socket having a central axis with diametrically opposed pairs of said side walls being parallel to each other, and pairs of adjacent side walls meeting to form corner portions to receive corners of the jackbolt head;
  a plurality of guiding members arranged circumferentially about an opening of the passage to guide the head of the jackbolt into the passage and align the plurality of sides of the head of jackbolt such that corners of the jackbolt head are aligned into position with corner portions of said pairs of adjacent side walls.

In an embodiment, each guiding member comprises a pair of guiding surfaces wherein the guiding surfaces for each pair are angled relative to each other such that upon contacting the head of the jackbolt, the side of the head is biased by at least one of the guiding surfaces of one or more of said guiding members to align corners of the jackbolt head into position with corner portions of said pairs of adjacent side walls in the passage.

In an embodiment, the guiding surfaces of the circumferentially arranged guiding members extend from a circumferential outer edge portion of the socket towards a radially inner portion of the socket that is axially offset from the circumferential outer portion.

In an embodiment, each of the guiding surfaces in said projection diverges towards the circumferential outer edge.

In an embodiment, each guiding surface slopes in a direction extending from the circumferential outer edge portion of the socket towards the radially inner portion of the socket.

In an embodiment, the internal side walls extend along a length of the passage in a direction from the first end towards the second end of the socket.

In an embodiment, respective planes for the pair of guiding surfaces in each guiding member intersect each other at an acute angle in the range of 30 degrees to 60 degrees and more preferably 45 degrees.

In an embodiment, the side walls in said pairs of adjacent side walls meet at an angle of greater than 90 degrees and at least 100 degrees to form the corner portions to receive corners of the jackbolt head.

In an embodiment, each of the guiding members further comprises one or more radially inwardly directed surfaces extending in between adjacently located lateral sides the divergent surfaces.

In an embodiment, each of the guiding members comprises at least two inwardly directed surfaces extending from an upper portion of the projection to a lower portion of the projection and sloping from the circumferential outer edge portion of the socket towards the radially inner portion of the socket.

In an embodiment, each of the guiding surfaces is positioned adjacent at least one of the inwardly directed surfaces and wherein a plane of the divergent surface is disposed at an angle of less than 90 degrees and preferably greater than 45 degrees relative to an imaginary plane of the adjacently located inwardly directed surface.

In an embodiment, each of the guiding surfaces is quadrangular.

In an embodiment, each of the guiding members comprises at least two inwardly directed surfaces of respective internal side walls extending from an upper portion of the projection to a lower portion of the projection.

In an embodiment, each of the guiding surfaces meets a respective inwardly directed surfaces along a common edge portion and wherein a plane of the guiding surface is disposed at an angle of less than 90 degrees and preferably greater than 45 degrees relative to an imaginary plane of the respective inwardly directed surface.

In an embodiment, each inwardly directed surface is triangular.

In an embodiment, each of the inwardly directed triangular surfaces is joined together along a respective side of each triangular surface to form an inner edge portion of the projection.

In an embodiment, the inner edge is oriented at an angle of less than 30 degrees relative to a longitudinal axis of the socket. Preferably, the angle lies in the range of 10 to 20 degrees and more preferably the angle is 15.5 degrees.

In an embodiment, the upper portion of each projection comprises a respective chamfered face positioned along each of the divergent surfaces.

In an embodiment, the socket further comprises a spindle receiving opening at or adjacent the second end for receiving a spindle of a jackbolt tensioning device.

BRIEF DESCRIPTION OF THE DRAWINGS

In order that this invention may be more readily understood and put into practical effect, reference will now be made to the accompanying drawings which illustrate a preferred embodiment of the invention and wherein:

FIGS. 15A, 15B and 15C illustrate sequential in-use views of the socket 100.

DETAILED DESCRIPTION

Figure 1:
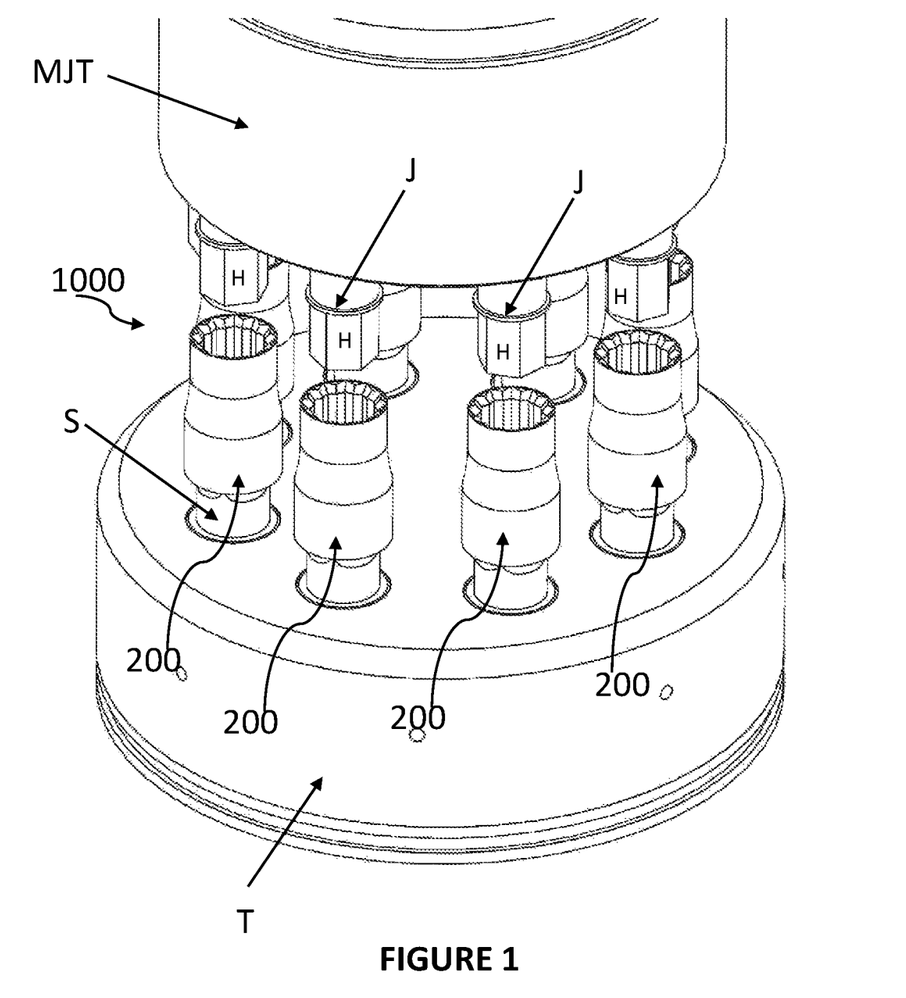
FIG. 1 is a perspective view of an assembly 1000 for simultaneously tensioning a plurality of jackbolts J of a multi-jackbolt tensioner MJT.
Figure 2:
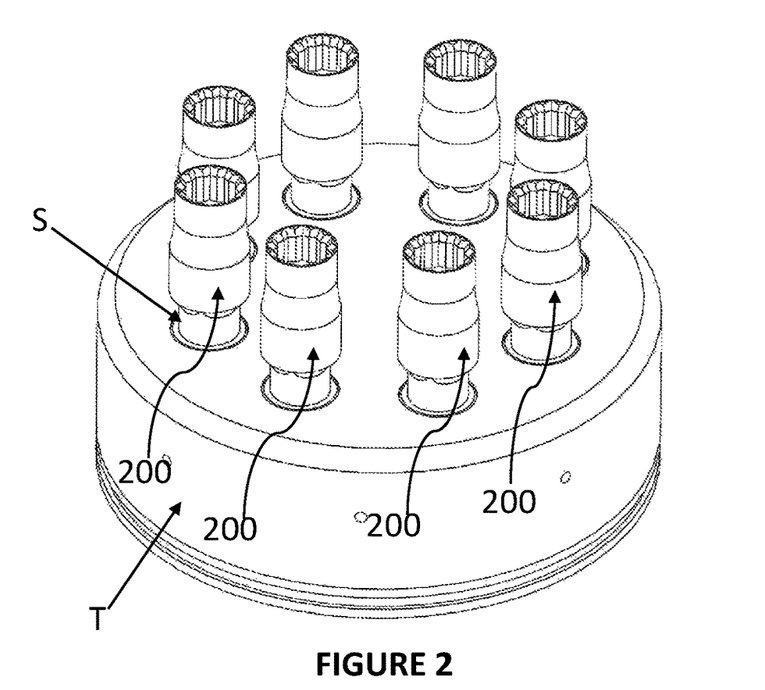
FIG. 2 is a perspective view of an assembly 1000 for simultaneously tensioning a plurality of jackbolts J (MJT not shown).
Figure 3:
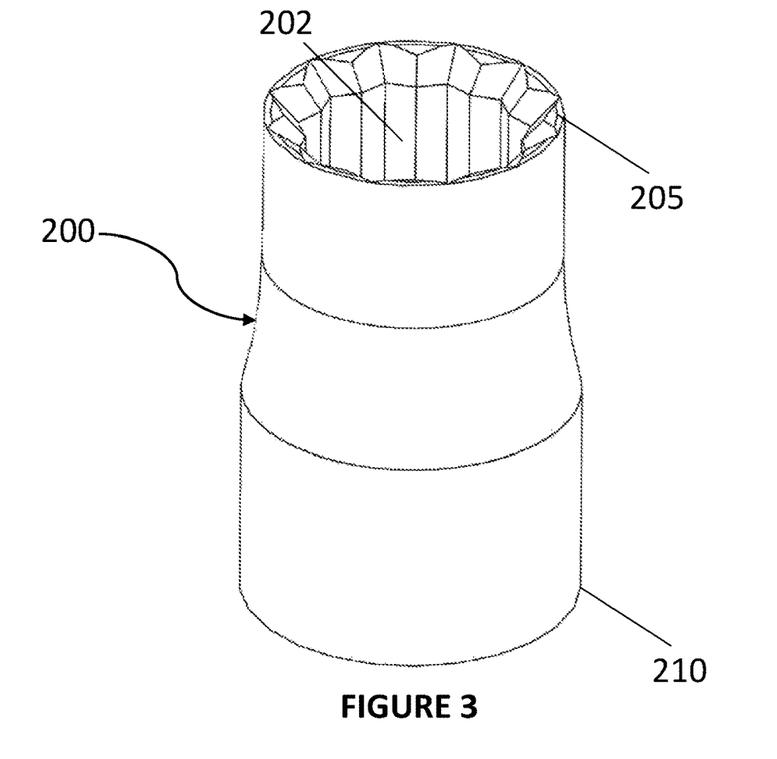
FIG. 3 is a top perspective view of a socket 200 in accordance with an embodiment of the present invention.

Referring to FIGS. 1 and 2, an assembly for simultaneously tensioning a plurality of jackbolts of a multi-jackbolt tensioner (MJT) (shown in FIGS. 1 and 2) is depicted. The assembly comprises a tensioning device T having a first plurality of spindles S that are arranged to simultaneously tension the plurality of jackbolts on the MJT. Each spindle cooperates with a respective socket 200, in accordance with an embodiment of the present invention, to engage an individual head H of a jackbolt J in an initially engaged configuration. The presently claimed invention, in at least some embodiments, provides the sockets 200 that engage with each jackbolt head H to allow the jackbolts to be tensioned or untensioned.

Figure 4:
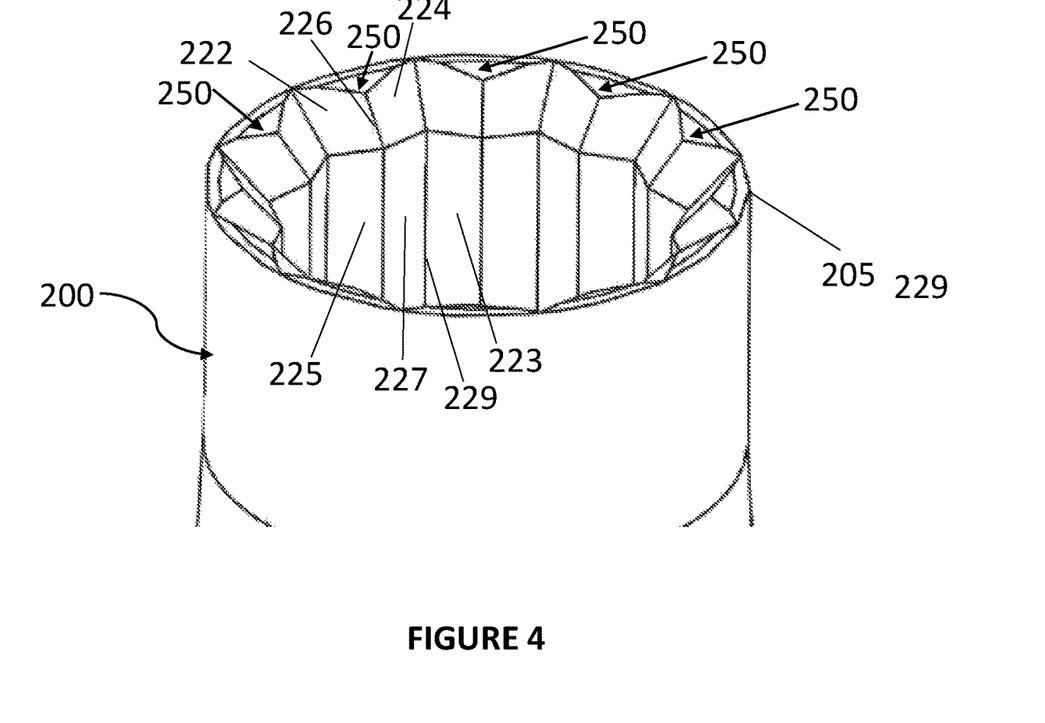
FIG. 4 is an enlarged top perspective view of the socket 200.
Figure 5:
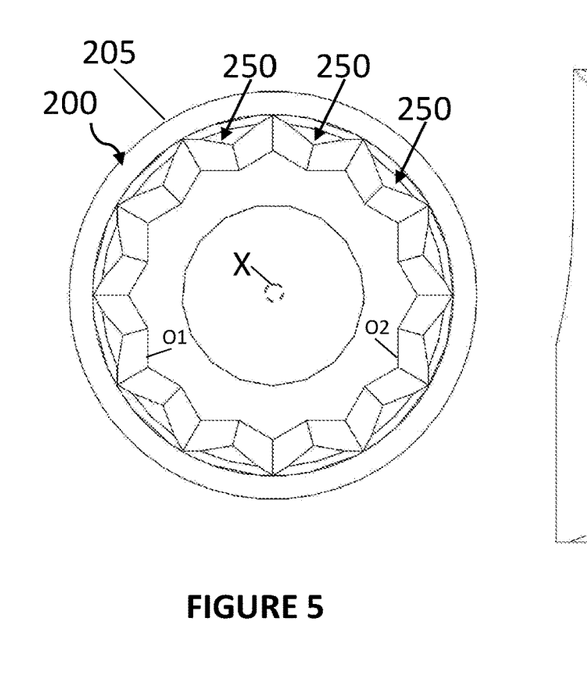
FIG. 5 is a top view of the socket 200.
Figure 6:
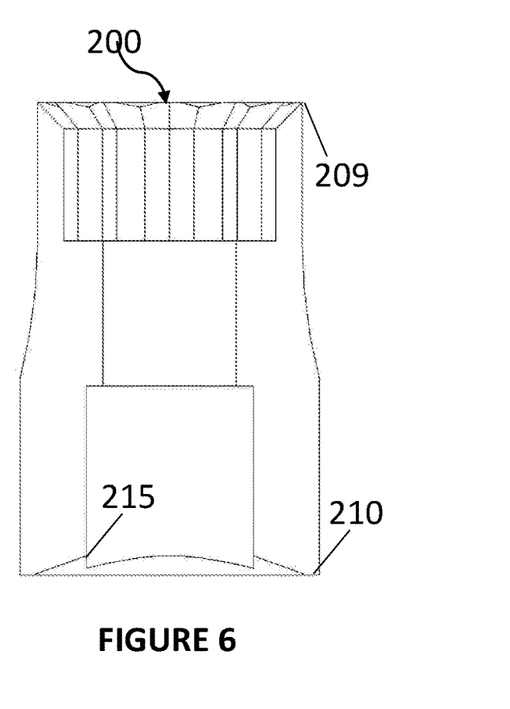
FIG. 6 is a sectional view of the socket 200.

Referring to FIGS. 3 to 6, detailed views of each of said sockets 200 have been provided. Each socket includes a passage 202 with an opening 205 at a first end of the socket 200. During use, it is desirable to align and center each jackbolt head H into the opening 205. Turning to FIG. 4, the passage is defined by a plurality of even-numbered internal side walls dimensioned to engage a plurality of sides of the head H of the jackbolt received into the passage 202. In the presently described embodiment, the passage 202 is defined by 12 pairs of internal side walls that are arranged in a polar array about a central axis X. The passage 202 is defined by diametrically opposed pairs of said side walls (such as O1; O2) being parallel to each other, and pairs of adjacent side walls such as 227 and 223 meeting to form corner portions 229 to receive corners of the jackbolt head H. The side walls 223 and 227 forming the corner portions 229 that receive the corners of the head of the jackbolt J are angled at 120 degrees. However, the angle between the adjacent side walls of the passage 202 may be varied to accommodate other non-hexagonal shapes for the head portion of jackbolts in an MJT. In the preferred embodiment, the passage 202 extends in a direction from a first end 209 to a second end 210 of the socket. However, the passage 202 does not extend along the entire height of the socket 200.

A plurality of circumferentially arranged guiding members 250 are provided about the opening 205 of the passage 202 to guide the jackbolt head into the passage 202 and align the plurality of sides of the head of jackbolt such that corners of the jackbolt head (such as C1—See FIGS. 7A to 7D)) are aligned into position with corner portions 229 of said pairs of adjacent side walls 223 and 227.

Each guiding member 250 comprises a pair of guiding surfaces 224 and 226 that are angled relative to each other and diverge away from each other towards a circumferential outer portion of the socket 200. In the preferred embodiment, the divergent guiding surfaces are angled at 45 degrees to each other. However, this Upon contacting the head of the jackbolt, the side of the head is biased by one of the guiding surfaces (224 or 226) to align corners of the jackbolt head into position with corner portions 229 of said pairs of adjacent side walls 223 and 227 in the passage 202. It is important to note that the guiding surfaces 224 and 226 of the circumferentially arranged guiding members slope inwardly extending from a circumferential outer edge portion of the socket 200 towards a radially inner portion of the socket 200 that is axially offset from the circumferential outer portion. The inwardly sloping configuration of the guiding surfaces 224 and 226 in combination with the mutually angled configuration of the guiding surfaces 224 and 226 in each guiding member 250 effect the guiding members 250 to collectively align and centre the head H of the jackbolt J into the passage 202.

Figure 7A:
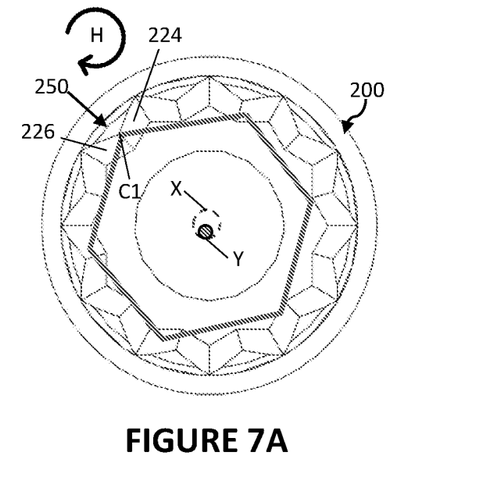
FIGS. 7A to 7D illustrate sequential in-use views of the socket 200.
Figure 7B:
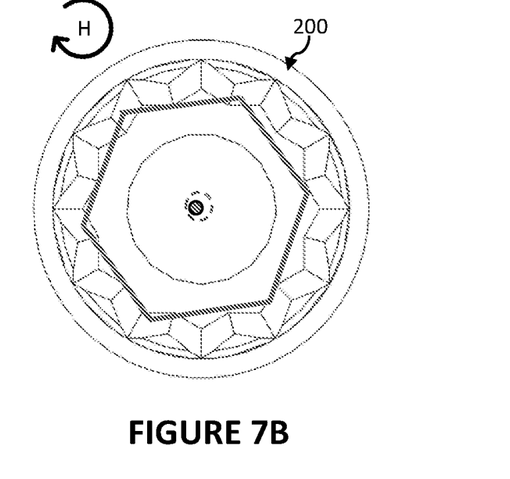
Figure 7C:
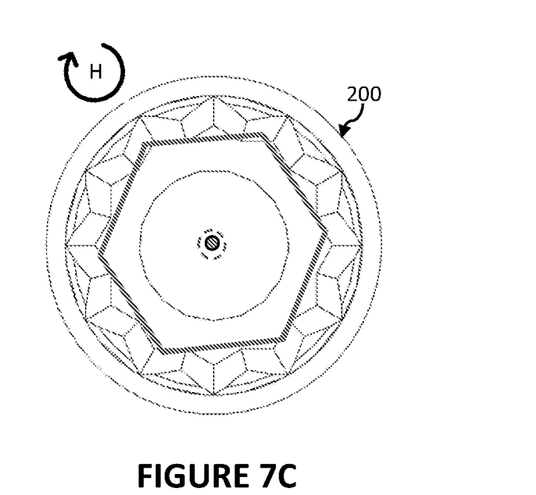
Figure 7D:
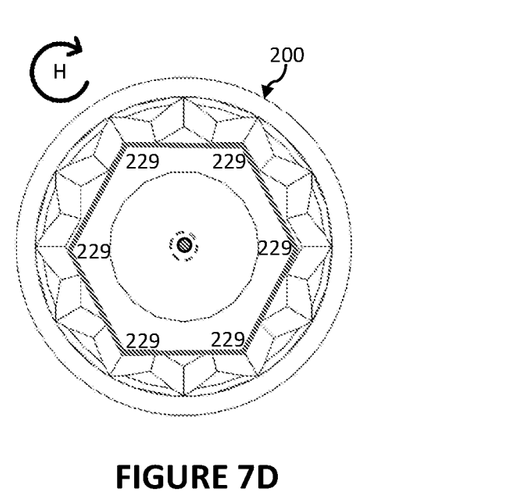

FIGS. 7A to 7D illustrate the manner in which the socket 200 is useful in self-aligning and self-centering the socket 100 relative to a hexagonal jackbolt head (H). FIG. 7A illustrates an initial position in which the corners of the hexagonal jackbolt (H) are not in alignment with corner portions 229 formed by adjacent pairs of the internal side walls 223 and 227 of the passage 202 of the socket 100. It is also important to note that in the initial or starting position of FIG. 7A, the head (H) of the jackbolt is not centered within the passage 202 ie. the centre Y of the jackbolt head (H) is offset from the central axis X of the passage 202.

In order to clearly understand the working of the socket 200, it would be best to follow the movement of a corner (such as C) of the jackbolt head (H) sequentially from FIGS. 7A to 7D. The guiding surface 224 slopes away from the other guiding surface 226 (due to the angled configuration). As a result, upon contacting the guiding surface 224, the corner C1 is biased by the guiding surface 224 resulting in a gradual movement of the corner C1 in a clockwise direction (as shown by the rounded arrow-FIGS. 7A to 7D in sequence). Therefore, the guiding surface 224 imparts a self-aligning effect to the corner C1 of the head (H). Similarly, if the corner portion C1 contacted the guiding surfaces 226, then the head (H) would undergo anti-clockwise movement. Advantageously, each of the guiding surfaces 224 and 226 also slope inwardly and downwardly from a circumferential outer edge portion of the socket 200 towards a radially inner portion of the socket 200. As a result, upon contacting guiding surfaces 224 or 226, the corner portion C1 not only undergoes clockwise or anticlockwise movement, the corner portion C1 (and the head H) also undergo axial movement (as shown by movement of the centre Y of the head (H) such that each of the corners (such as C1) of the head (H) are aligned into position with corner portions 229 formed by adjacent side walls 223 and 227.

Figure 8:
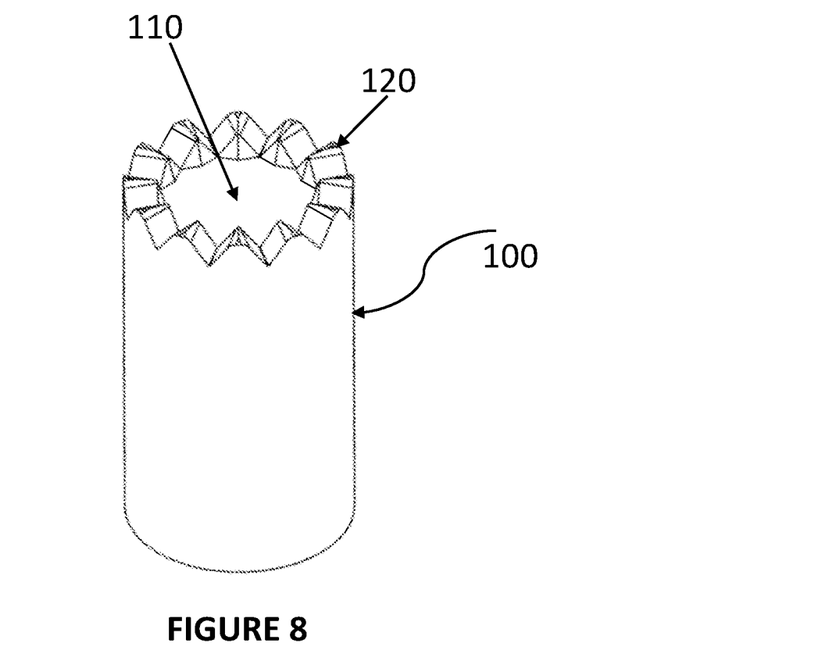
FIG. 8 is an orthogonal view of a socket 100 in accordance with a second embodiment of the invention.
Figure 9:
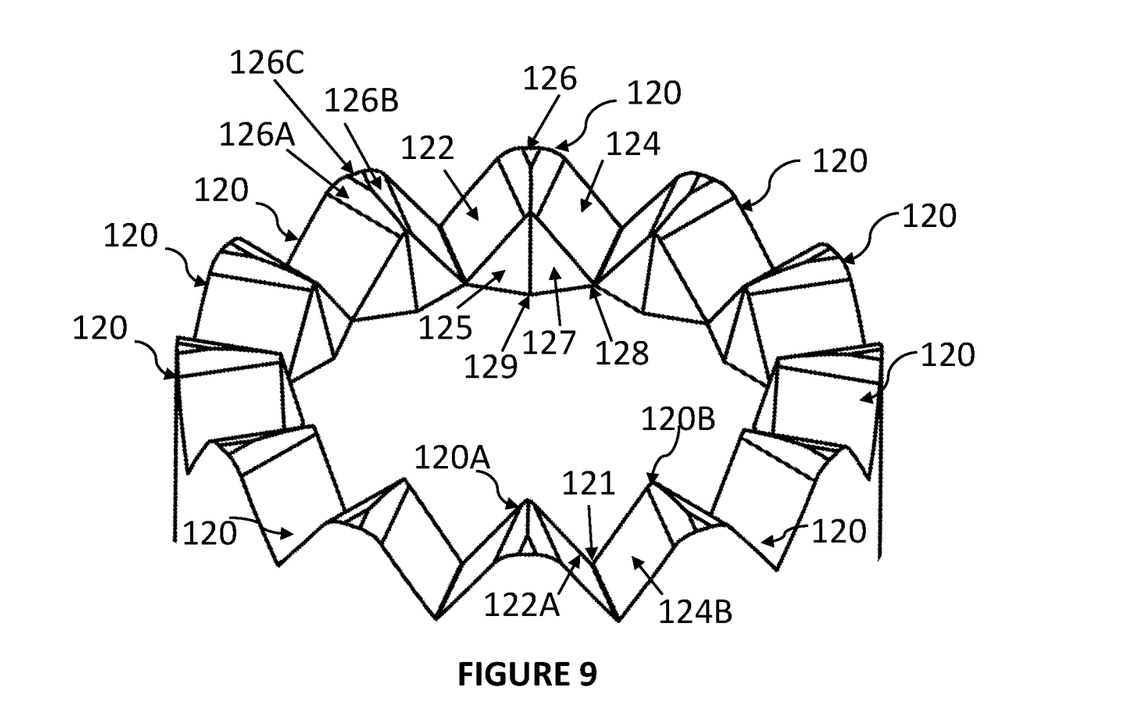
FIG. 9 is an enlarged orthogonal view of the socket 100.
Figure 10:
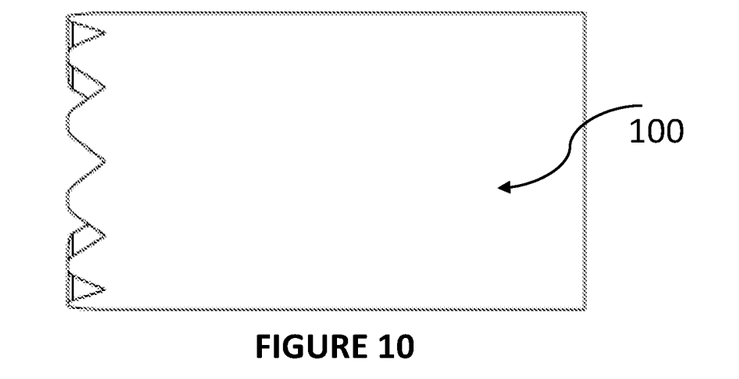
FIG. 10 is a side view of the socket 100.
Figure 11:
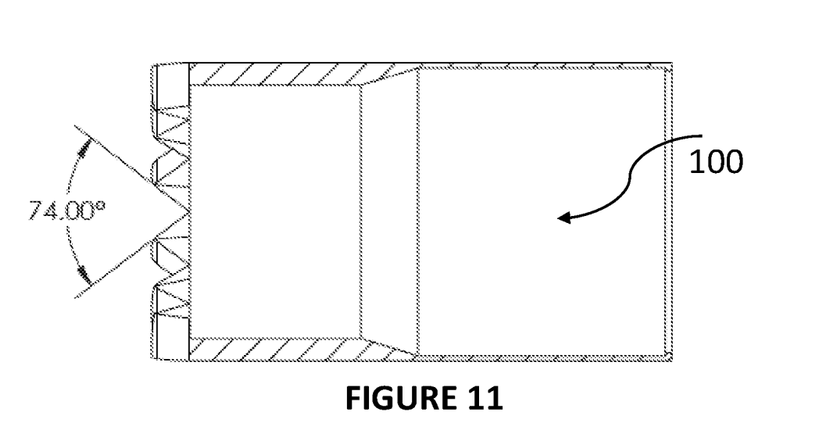
FIG. 11 is a first sectional view of the socket 100.
Figure 12:
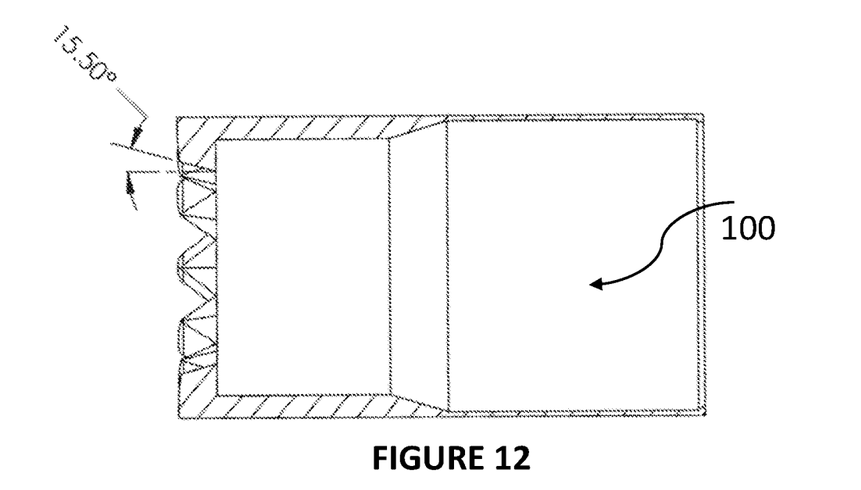
FIG. 12 is a second sectional view of the socket 100.
Figure 13:
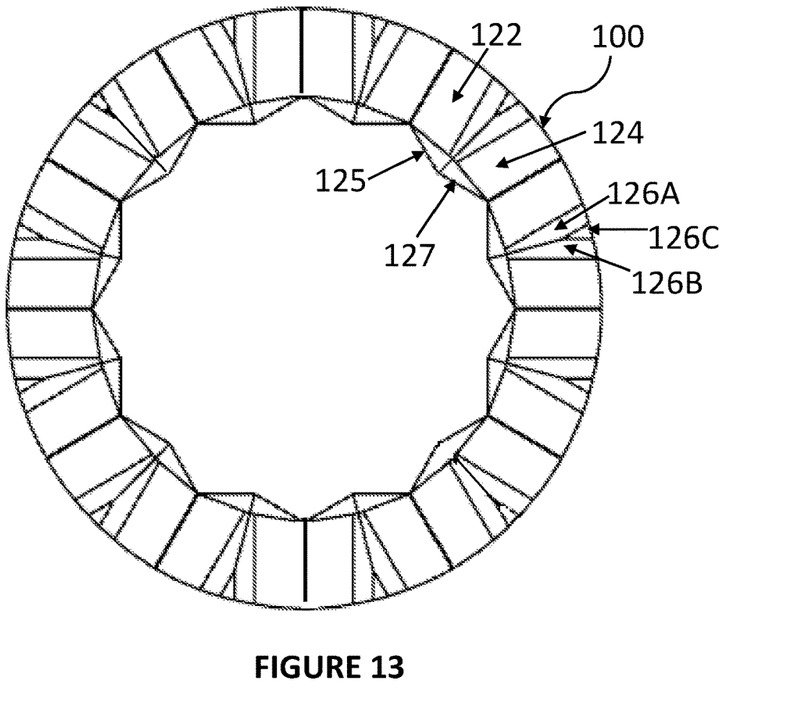
FIG. 13 is a top view of the socket 100.
Figure 14:
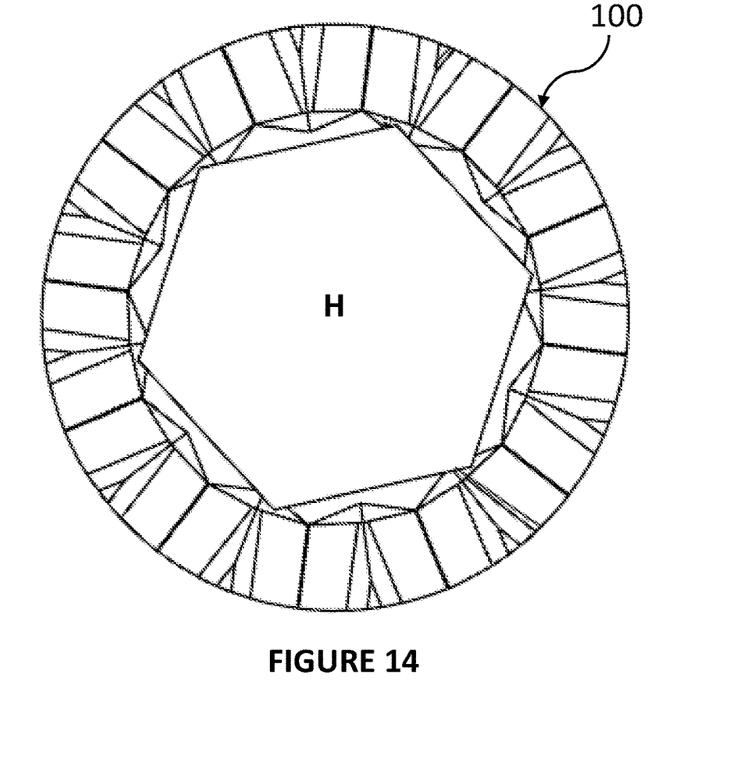
FIG. 14 is an in-use top view of the socket 100 (shown in engagement with a hexagonal nut/bolt-H)

FIGS. 8 to 17 depict a second embodiment of a socket 100 for simultaneously tensioning a plurality of jackbolts of a multi-jackbolt tensioner (MJT). As shown in FIGS. 8 and 9, the socket 100 comprises an opening 110 that is defined by a plurality of side walls that are dimensioned to engage with a hexagonal head (H) of a jackbolt (see FIG. 16). The socket 100 comprises a plurality of substantially identical projecting members 120 that are arranged circumferentially about the opening 110. It must be understood that the presently described embodiment comprises 12 identical projections 120 that are circumferentially arranged about the opening 110. However, the number of projections 120 arranged around the opening 110 is not limiting and may be varied in other alternative embodiments. The configuration of each of the projecting members 120 (which will be detailed in the foregoing sections) allows the projections to guide and align the hexagonal head of the jackbolt with corresponding walls of the opening 110. The projecting members 120 also guide the hexagonal head in order to center the head of the jackbolt in order to be correctly positioned in the opening 110.

Turning to FIG. 9, the configuration of each of the projecting members 120 has been illustrated in further detail. Each projecting member 120 comprises a pair of divergent guiding surfaces 122 and 124 that diverge in a downwardly direction from an upper portion 126 of the projection 120 towards a lower portion 128 of an adjacently located projection 120. Each of the upper portions 126 and the divergent surfaces 122 and 124 for all the projecting members 120 form a peripheral edge of the socket 100. It is important to note that one of the divergent surfaces 122A of a first projecting member (120A) and one of the divergent surfaces 124B of an adjacently located second projecting member (120B) define a V-shaped cavity 121. Advantageously, the angle between the adjacently located divergent surfaces 122A and 124B is in the range of 60 and 90 degrees and more preferably 74 degrees (as shown in FIG. 4). When the user pushes the socket 100 onto the head (H) of the jackbolt nut of the jackbolt, the divergent or sloping surfaces (122 or 124) for each V-shaped cavity 121 provide a bias that results in sufficient torsional/rotational forces being applied which translates the pushing force (applied by the user) into rotational force that results in rotation of the socket 100 or the hexagonal jackbolt head (H) every time a user pushes the socket 100. Each of the divergent surfaces 122 or 124 also slopes inwardly from a circumferentially outer portion to a circumferentially inner portion of the socket 100. As a result, the rotational action of the socket 100 or the head (H) of the jackbolt therefore results in the socket 100 and the jackbolt head (H) being biased to undergo a rotational movement in combination which aligns the corners of the head (H) with corresponding corners 128 of the passage 110 but also helps with centering the head (H) into the passage 110.

Each projecting member 120 also includes two inwardly directed triangular surfaces 125 and 127 that extend in an inwardly direction and are positioned contiguously relative to each other. The triangular surfaces 125 and 127 extend between adjacently located lateral sides of the divergent surfaces 122 and 124. The inwardly directed surfaces 125 and 127 meet along an inner edge 129 which is disposed at a small angle (preferably in the range of 12 to 20 degrees and more preferably at 15.5 degrees) relative to a longitudinal axis of the socket 100. The provision of the triangular inwardly directed surfaces 125 and 127 is important for assisting with the centering of the socket 100 relative to the jackbolt head of the jackbolt so that the planar inner walls defining the opening 110 are in alignment with the hexagonal head of the jackbolt in order to effect tensioning or untensioning of the jackbolt. The inwardly directed surfaces 125 and 127 for each of the projecting members 120 provide a slightly convergent (or funnel shaped) entrance into the socket 100 that enables the socket 100 to centre the hex nut/bolt as it is directed in a downwardly direction once the divergent surfaces 122 and 124 have provided an initial rotation or twist to the socket 100 or the hex nut/bolt.

The upper portion 126 for each projecting member 120 comprises respective chamfered faces 126A and 126B that are positioned along each of the divergent surfaces 122 and 124 respectively. Each of the chamfered faces 126A and 126B is substantially trapezoidal and outwardly located portions of each of the chamfered faces 126A and 126B are spaced apart by a triangular upper face 126C of the upper portion 126. In some embodiments, the upper face 126C may be angled or slope for further assisting with the guiding and centering the hex nut/bolt.

Figure 15A:
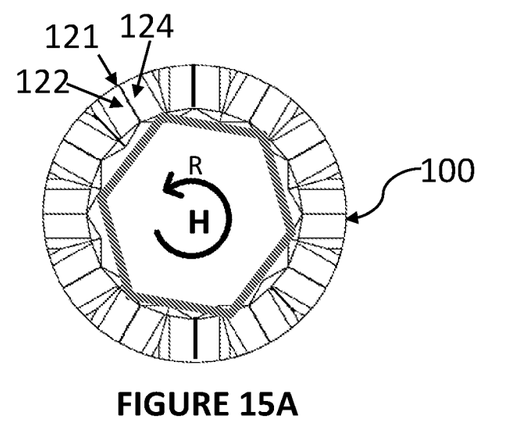
Figure 16B:
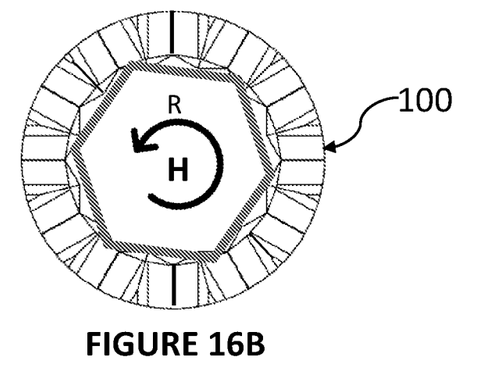
Figure 17C:
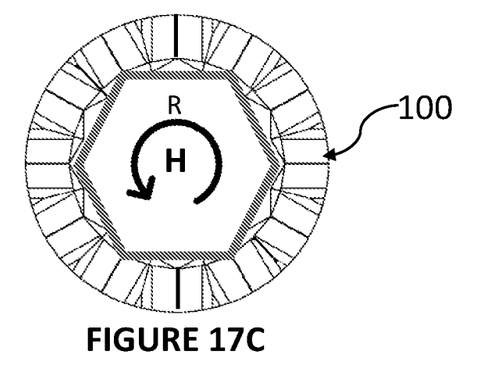

FIGS. 15A to 15C illustrate the manner in which the socket 100 is useful in self aligning the socket 100 relative to a jackbolt head or bolt (denoted by H). FIG. 15A illustrates an initial position in which the hexagonal bolt (H) is not in alignment with the opening 110 of the socket 100. The divergent surfaces 122 and 124 for adjoining projecting members 120 form the V-shaped cavity 121 (as previously discussed). When a misaligned socket 100 is pressed against the hexagonal bolt (H), the corners of hexagonal head (H) come into direct contact with one of the divergent surfaces 122 or 124. FIG. 15A indicates contact between divergent surface 124 and one of the corners of the hexagonal head (H). The sloping configuration of the divergent surfaces (122 and 124) results in the gradual sliding of the corner portion of the hexagonal bolt (H) substantially towards a central portion of the V-shaped cavity 121 (as shown in FIGS. 15B and 15C) as the jackbolt head (H) undergoes a slight rotational movement (or twisting action) particularly when the jackbolt head (H) is not under tension. It may be understood that in alternative embodiments, pushing of the socket 100 on to a jackbolt head (H) held under tension may cause rotational movement (or twisting) of the socket 100 (due to the sloping configuration of the divergent surfaces 122 and 124 of each projection member 120) to position the corner C of the jackbolt head (H) into the central portion of the V-shaped cavity 121. FIG. 15C depicts an aligned position in which the corner of the jackbolt head (H) is positioned substantially at a centre of the V-shaped cavity after the initial twisting has been carried out when the socket 100 is pushed.

Once the socket 100 and the jackbolt head (H) have been initially aligned by the divergent surfaces 122 and 124 of the projecting members 120, the inwardly directed triangular surfaces 125 and 127 provide additional functionality by centering the socket 100 relative the jackbolt head (H) and maintaining the jackbolt head (H) in an aligned position. The inwardly directed triangular surfaces 125 and 127 (which are oriented at a small angle of 15.5 degrees—as previously discussed) provide a funnel shaped or convergent entry point for the jackbolt head (H) before the jackbolt head (H) is fully received into the opening 110 of the socket 100.

In some other embodiments, the invention may be provided in the form of a socket attachment that can be positioned on conventional socket. Such a socket attachment may include a plurality of projection members 120 such that the projection members 120 become circumferentially arranged about the opening of the conventional socket. The socket attachment may comprise a coupling arrangement that allows the socket attachment to be fixedly coupled with a conventional socket S to guide and aligning the hexagonal head of the jackbolt with corresponding walls of the opening defined by the socket S. The socket attachment consists of a plurality of projecting members 120 arranged circumferentially about the opening of the socket S for guiding and aligning a plurality of sides of the fastener with corresponding walls defining the opening 110 of the socket S. The projecting members 120 comprise a similar configuration as the projecting members 120 in the previously described socket 100 and allow the jackbolt head/bolt and the socket S to be aligned to carry out tensioning or untensioning of the jackbolt head/bolt.

It should be noted that even though the presently described embodiments indicate the use of the socket 100 or the socket attachment 200 for tensioning and untensioning jackbolts for MJTs, the scope of the invention is in no way limited to use with MJT jackbolts. The socket 100, the socket attachment 200 and other alternative embodiments may be used for tensioning and untensioning fasteners of varying shapes and sizes without departing from the spirit and scope of the invention.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

The invention claimed is:

1. A socket for rotatably fastening or unfastening a jackbolt of a multi jackbolt tensioner, the socket extending between a first end and a second end such that the first end is adapted to receive the jackbolt, the socket comprising:
   a passage extending along a length of the socket to receive a head of the jackbolt, the passage being defined by a plurality of even-numbered internal side walls dimensioned to engage a plurality of sides of the head of the jackbolt received therein, the socket having a central axis with diametrically opposed pairs of said side walls being parallel to each other, and pairs of adjacent side walls meeting to form corner portions to receive corners of the jackbolt head;
   a plurality of guiding members arranged circumferentially about an opening of the passage to guide the head of the jackbolt into the passage and align the plurality of sides of the head of the jackbolt such that corners of the jackbolt head are aligned into position with corner portions of said pairs of adjacent side walls,
   wherein each guiding member comprises a pair of guiding surfaces wherein the guiding surfaces for each pair are angled relative to each other such that upon contacting the head of the jackbolt, the side of the head is biased by at least one of the guiding surfaces of one or more of said guiding members to align corners of the jackbolt head into position with corner portions of said pairs of adjacent side walls in the passage,
   wherein the guiding surfaces of the circumferentially arranged guiding members extend inwardly and downwardly from a circumferential outer edge portion of the socket towards a radially inner portion of the socket that is axially offset from the circumferential outer portion, and
   wherein each of the guiding surfaces in said pair of guiding surfaces diverge away from each other towards the circumferential outer edge.

2. The socket in accordance with claim 1 wherein the internal side walls extend along a substantial length of the passage in a direction from the first end towards the second end of the socket.

3. The socket in accordance with claim 1 wherein respective planes for the pair of guiding surfaces in each guiding member intersect each other at an acute angle in the range of 30 degrees to 60 degrees and more preferably 45 degrees.

4. The socket in accordance with claim 1 wherein the side walls in said pairs of adjacent side walls meet at an angle of greater than 90 degrees to form the corner portions to receive corners of the jackbolt head.

5. The socket in accordance with claim 1 wherein each of the guiding surfaces is quadrangular.

6. The socket in accordance with claim 1 further comprising a spindle receiving opening at or adjacent the second end for receiving a spindle of a jackbolt tensioning device.

7. A socket attachment adapted to be coupled to a socket for fastening or unfastening a jackbolt of a multi jackbolt tensioner wherein the socket comprises a plurality of side walls defining a passage such that pairs of adjacent side walls are adapted to receive a corner portion of a head of the jackbolt, the socket attachment comprising:
   a coupling arrangement for coupling the socket attachment to the socket;

a plurality of guiding members adapted to be arranged circumferentially about an opening of the passage in the socket to guide the head of the jackbolt into the passage and align the plurality of sides of the head of jackbolt such that corners of the jackbolt head are aligned into position with corner portions of said pairs of adjacent side walls, wherein each guiding member comprises a pair of guiding surfaces wherein the guiding surfaces for each pair are angled relative to each other such that upon contacting the head of the jackbolt, the side of the head is biased by at least one of the guiding surfaces of one or more of said guiding members to align corners of the jackbolt head into position with corner portions of said pairs of adjacent side walls in the passage, wherein the guiding surfaces of the circumferentially arranged guiding members extend inwardly and downwardly from a circumferential outer edge portion of the socket towards a radially inner portion of the socket that is axially offset from the circumferential outer portion, wherein each of the guiding surfaces in said pair of guiding surfaces diverge away from each other towards the circumferential outer edge.

8. A socket attachment adapted to be coupled to a socket for fastening or unfastening a jackbolt of a multi jackbolt tensioner fastener, the socket attachment comprising:

a coupling arrangement for coupling the socket attachment to the socket;

a plurality of projections arranged circumferentially about an opening of the socket for guiding and aligning a plurality of sides of the fastener with corresponding walls defining the opening of the socket;

wherein each projection comprises a pair of divergent surfaces, the divergent surfaces extending downwardly from an upper portion of the projection towards a lower portion of an adjacently located projection whereby the upper portion and the divergent surfaces of each of the projections form an peripheral edge of the socket such that upon downward pressing of the socket upon the fastener, a head portion of the fastener is biased by at least one of the divergent surfaces to align the plurality of sides of the fastener with corresponding walls of the opening, and wherein the divergent surfaces extend inwardly from a circumferential outer edge portion of the socket towards a radially inner portion of the socket that is axially offset from the circumferential outer portion.

9. The socket attachment in accordance with claim 8 wherein each of the guiding members further comprises one or more radially inwardly directed surfaces extending in between adjacently located lateral sides the divergent surfaces.

10. The socket attachment in accordance with claim 9 wherein each of the guiding surfaces is positioned to meet a respective inwardly directed surface along a common edge portion and wherein a plane of the guiding surface is disposed at an angle of less than 90 degrees and preferably greater than 45 degrees relative to an imaginary plane of the respective inwardly directed surface.

11. The socket attachment in accordance with claim 9 wherein each inwardly directed surface is triangular.

12. The socket attachment in accordance with claim 11 wherein each of the inwardly directed triangular surfaces is joined together along a respective side of each triangular surface to form an inner edge portion of the projection.

13. The socket attachment in accordance with claim 12 wherein the inner edge is oriented at an angle of less than 30 degrees relative to a longitudinal axis of the socket.

14. The socket attachment in accordance with claim 13 wherein the angle lies in the range of 10 to 20 degrees and more preferably the angle is 15.5 degrees.

15. The socket attachment in accordance with claim 8 wherein each of the guiding members comprises at least two inwardly directed surfaces sloping from an upper portion of the projection to a lower portion of the projection.

16. The socket attachment in accordance with claim 8 wherein each of the guiding surfaces is positioned adjacent at least one of the inwardly directed surfaces and wherein a plane of the divergent surface is disposed at an angle of less than 90 degrees and preferably greater than 45 degrees relative to an imaginary plane of the adjacently located inwardly directed surface.

17. The socket attachment in accordance with claim 8 wherein each of the guiding members comprises at least two inwardly directed surfaces of respective internal side walls extending from an upper portion of the projection to a lower portion of the projection.

18. The socket attachment in accordance with claim 17 wherein the upper portion of each projection comprises a respective chamfered face positioned along each of the divergent surfaces.

* * * * *